United States Patent
Cespedosa et al.

[11] Patent Number: 6,076,467
[45] Date of Patent: Jun. 20, 2000

[54] SYSTEM FOR ATTACHING AND SEPARATING SATELLITES

[75] Inventors: Fernando Cespedosa; Jose Luis Garcia; Miguel Lancho; Lorenzo Martinez, all of Madrid, Spain

[73] Assignee: Construcciones Aeronauticas, S.A., Madrid, Spain

[21] Appl. No.: 09/099,493

[22] Filed: Jun. 18, 1998

[30] Foreign Application Priority Data

Sep. 26, 1997 [ES] Spain ..................... 9702028

[51] Int. Cl.⁷ .............. B64G 1/64; B64G 1/62; B64G 1/00; F42B 15/36; F42B 15/10
[52] U.S. Cl. .......... 102/378; 102/377; 244/161; 244/158 R
[58] Field of Search ............... 244/161, 158 R; 102/377, 378

[56] References Cited

U.S. PATENT DOCUMENTS

| | | | |
|---|---|---|---|
| 3,196,635 | 7/1965 | Schmitter | 464/54 |
| 3,244,104 | 4/1966 | Mills et al. | 102/378 |
| 3,346,929 | 10/1967 | Holman | 24/494 |
| 3,438,303 | 4/1969 | Pesarini et al. | 89/1.818 |
| 3,458,217 | 7/1969 | Pride, Jr. et al. | 244/158 R |
| 3,501,112 | 3/1970 | Bamford | 244/158 R |
| 3,505,925 | 4/1970 | Carr | 244/158 R |
| 3,564,564 | 2/1971 | Cobin et al. | 403/327 |
| 3,633,456 | 1/1972 | Carr et al. | 89/1.14 |
| 3,737,117 | 6/1973 | Belew | 244/161 |
| 4,627,355 | 12/1986 | Gause et al. | 102/378 |
| 5,352,061 | 10/1994 | Robinson | 244/161 |
| 5,390,606 | 2/1995 | Harris | 102/378 |
| 5,411,349 | 5/1995 | Hornung et al. | 403/338 |
| 5,649,680 | 7/1997 | Andersson | 244/161 |
| 5,860,624 | 1/1999 | Obry et al. | 244/158 R |
| 5,898,123 | 4/1999 | Fritz et al. | 102/378 |

FOREIGN PATENT DOCUMENTS

| | | | |
|---|---|---|---|
| 081401 | 10/1982 | European Pat. Off. | |
| 167433 | 6/1985 | European Pat. Off. | |
| 267279 | 12/1987 | European Pat. Off. | |
| 493211 | 12/1991 | European Pat. Off. | |
| 472453 | 2/1992 | European Pat. Off. | 102/378 |
| 547823 | 6/1993 | European Pat. Off. | 102/377 |
| 0768241A1 | 4/1997 | European Pat. Off. | |
| 2721001 | 12/1995 | France | 244/161 |
| 1922730 | 2/1971 | Germany | 102/378 |
| 2062087 | 7/1972 | Germany | 102/378 |
| 4038780 | 6/1992 | Germany | 102/377 |
| 1740970 | 6/1992 | U.S.S.R. | 102/377 |
| 1077581 | 8/1967 | United Kingdom | 102/378 |
| 1220994 | 1/1971 | United Kingdom | |
| 8707235 | 12/1987 | WIPO | |

OTHER PUBLICATIONS

"Confined Explosive Separation System", Raymond E. Lake, McDonnell Aircraft Company, Jun. 1969.

*Primary Examiner*—Michael J. Carone
*Assistant Examiner*—Fredrick T. French, III
*Attorney, Agent, or Firm*—Ladas & Parry

[57] ABSTRACT

System for attaching and separating satellites which comprises an open ring or metal band (1) which has a channel formed in its inner perimeter, in which jaws are integrated in a discontinuous way, which can slide in the said channel, two end pieces (5) fixed to the ends of the said ring, a tensioning bolt (4) which joins the two end parts, and three supports for retaining the ring (1) which are fixed to the structure of the launcher (3) of a satellite (2). The invention can be applied to artificial satellites of any weight and size.

12 Claims, 6 Drawing Sheets

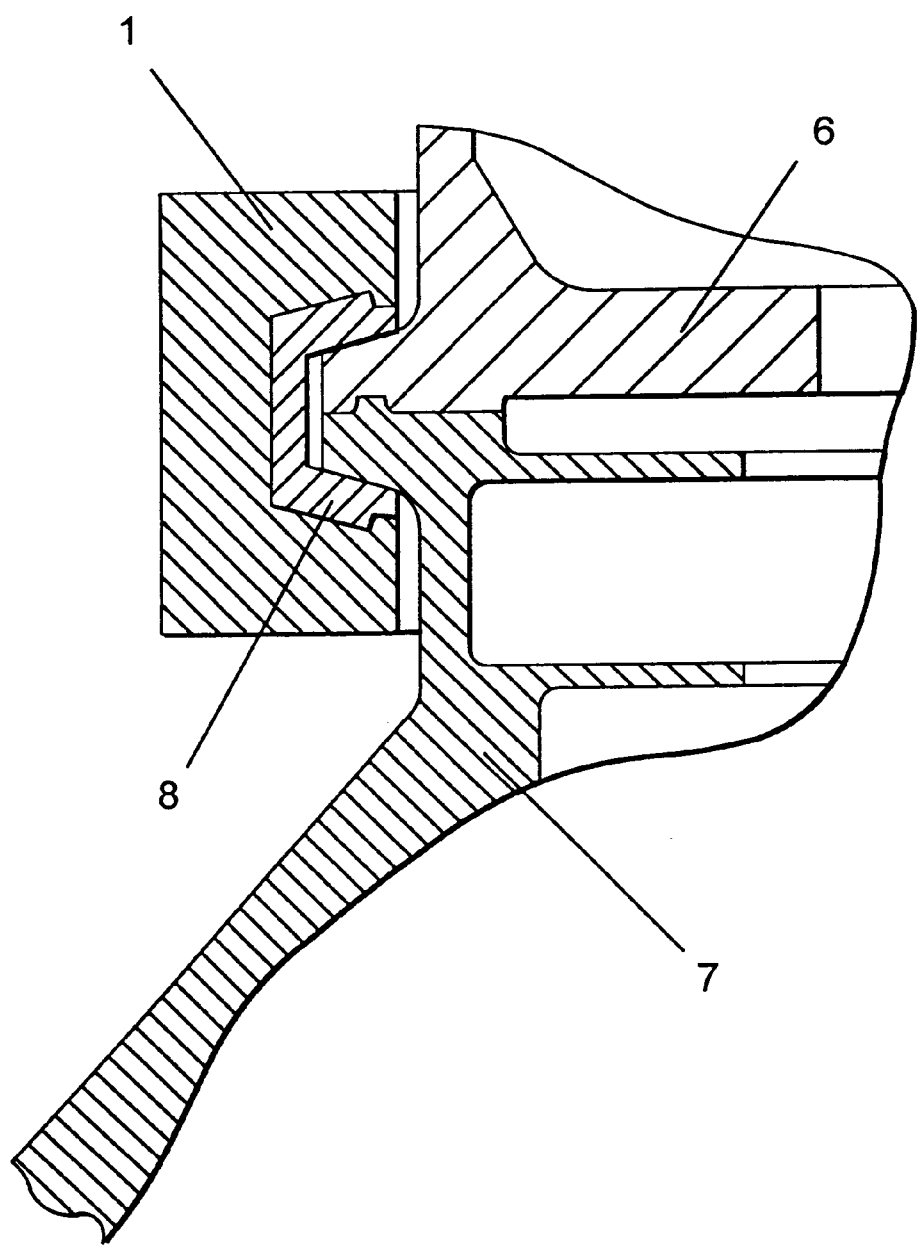
F I G. 2

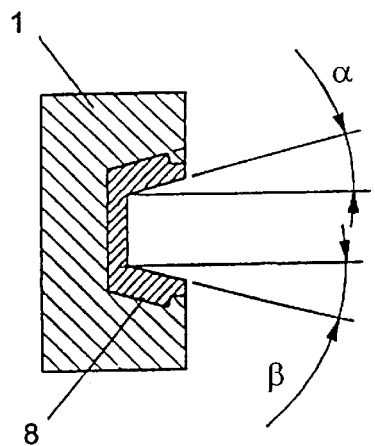
F I G. 5
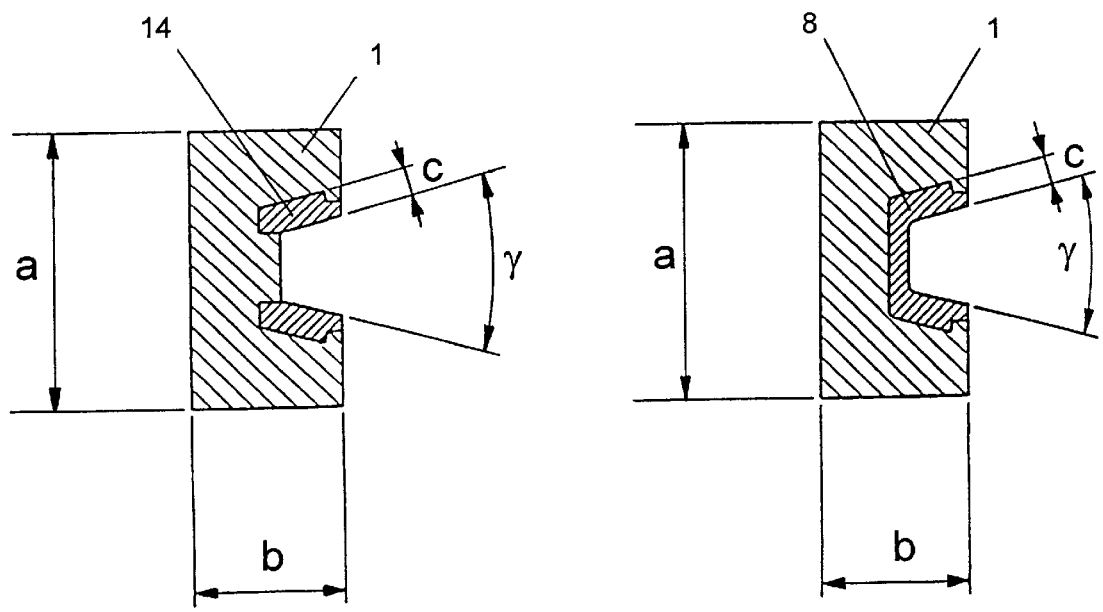
F I G. 7
F I G. 6

SYSTEM FOR ATTACHING AND SEPARATING SATELLITES

BACKGROUND OF THE INVENTION

The present invention relates to a system for attaching and separating satellites, which is of the belt or band type and which makes it possible to link two structures consisting of a satellite and its launcher, to keep them together, withstanding the loadings which are generated during the launch, to separate the upper structure (satellite) from the lower structure (launcher) when a command activates a pyrotechnic charge unit, and, finally, to park the band of the attaching and separating system automatically in a stable position in the launcher.

BACKGROUND OF THE INVENTION

Various systems are already known with means for separating a satellite and its launch rocket once the orbit selected for the satellite has been reached. Among these systems of the prior art is found the clamp for separable parts of spaceships which is described in EP-A-0 267 279. This clamp joins two separable parts of a spaceship, each of which has a bevelled rim which has grooves on its circumference. The clamp comprises retainers internally configured to match the rims of the said separable parts and joined by means of a tensioning band, each retainer including a shearing spigot which engages in a corresponding groove of the said rims and transmits loads directly between the two separable parts of the spaceship.

Another system for attaching and separating satellites has been described in EP-A-0 768 241. This system comprises an adapter mounted on a launch rocket and designed to fasten the latter to a satellite, an attaching piece screwed onto an upper hoop of the adapter, a tensioning band of strip metal, curved metal pieces for attaching the satellite which have a thin-walled cylindrical body and which bear on a lower hoop of the satellite, and tightening cams equipped with two rotating pins.

SUMMARY OF THE INVENTION

Taking into account the state of the prior art, the applicant has now developed a system for attaching and separating satellites which exhibits noteworthy innovations compared with the systems known today, and which improves on their functional characteristics.

To that end, the system for attaching and separating satellites of the invention consists of an open ring or metal band which has a channel formed in its inner perimeter, in which a series of wedge- or jaw-shaped pieces are integrated in a discontinuous way, which can slide in the said channel and consist of a material which is different from that of the said metal ring; two end pieces, each of them fixed to one end of the said ring; a bolt which serves to tension the said ring when it is applied to the interface joining the satellite and launcher structures and which joins the two end pieces, it being possible for the said bolt to be cut by the action of a pyrotechnic charge unit; and three supports for retaining the ring, which are fixed to the structure of the launcher, two of which are close to the ends of the ring and the third of which is opposite the opening of the said ring and has a spring which pulls on the ring during its extraction in order to release the satellite from the launcher.

The channel formed in the inner perimeter of the metal ring can take various configurations in cross-section, preferably being approximately U- or C-shaped.

Likewise, the cross-section of the jaws can be varied on the basis of the requirements of the application, possibly being, for example, the result of combining the angles of the interface with the satellite and the launcher.

The jaws may preferably consist of a continuous profile of approximately U-shaped cross-section. As an alternative, the jaws can be formed by two independent profiles joined together through the base of the channel of the said ring.

According to the invention, the metal ring can be of aluminum or an aluminum alloy, and the jaws can be of plastic, composite or other material with properties appropriate for it to slide in the said ring.

BRIEF DESCRIPTION OF THE DRAWINGS

For a more complete understanding of the present invention, it will be described below in greater detail, making reference to the attached drawings, in which:

FIG. 2 is a sectional view showing the form in which the system of the invention is applied to the satellite and to the launcher, FIG. 5 is a section illustrating the angles of inclination of the inner faces of the jaws, FIG. 6 is a cross-section of the metal band of the system of the invention, in which the jaw integrated into it has a U-shaped profile, and FIG. 7 is a cross-section of the metal band of the system of the invention, in which the jaw integrated into it is formed by two independent profiles.

DETAILED DESCRIPTION OF THE INVENTION

Figure 1:
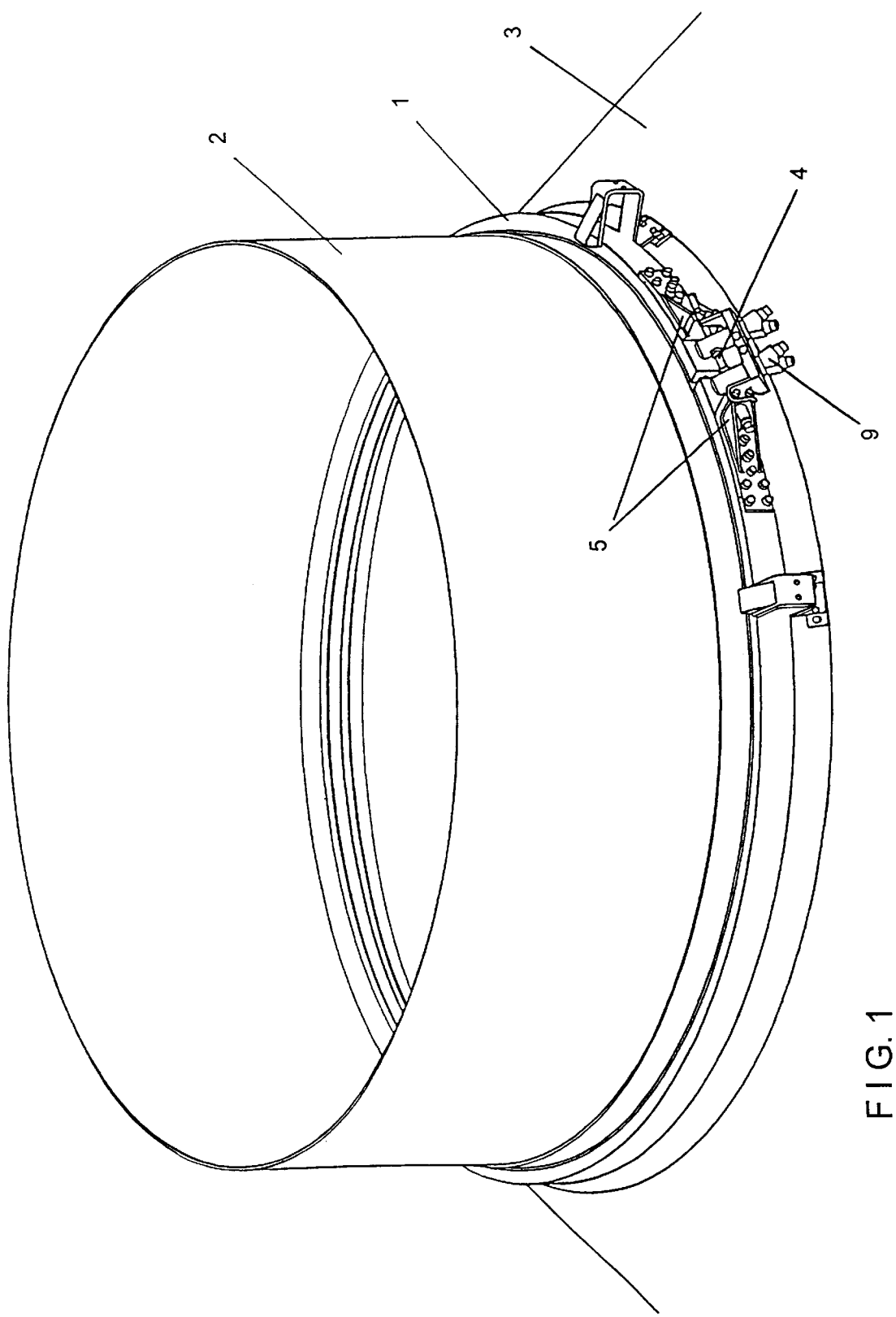
FIG. 1 is a view in perspective which illustrates the coupling of a launcher and a satellite by means of the system of the invention.

As can be gathered from the drawings, the system for attaching and separating satellites in accordance with the invention consists of an open ring or metal band 1 which runs round the structures of a satellite 2 and a launcher 3 over the interface which joins them. This ring 1 can be tensioned by means of a bolt 4 which links two end pieces 5 fixed to the ends of the metal band 1 and which, in order to separate the satellite 2 from the launcher 3, can be cut by the action of a pyrotechnic charge unit 9. The tension applied to the band or ring 1 causes clamping pressure between the interface hoops 6 and 7 of the satellite 2 and launcher 3 structures, which allows both structures to be kept together as long as pressure exists.

Figure 3:
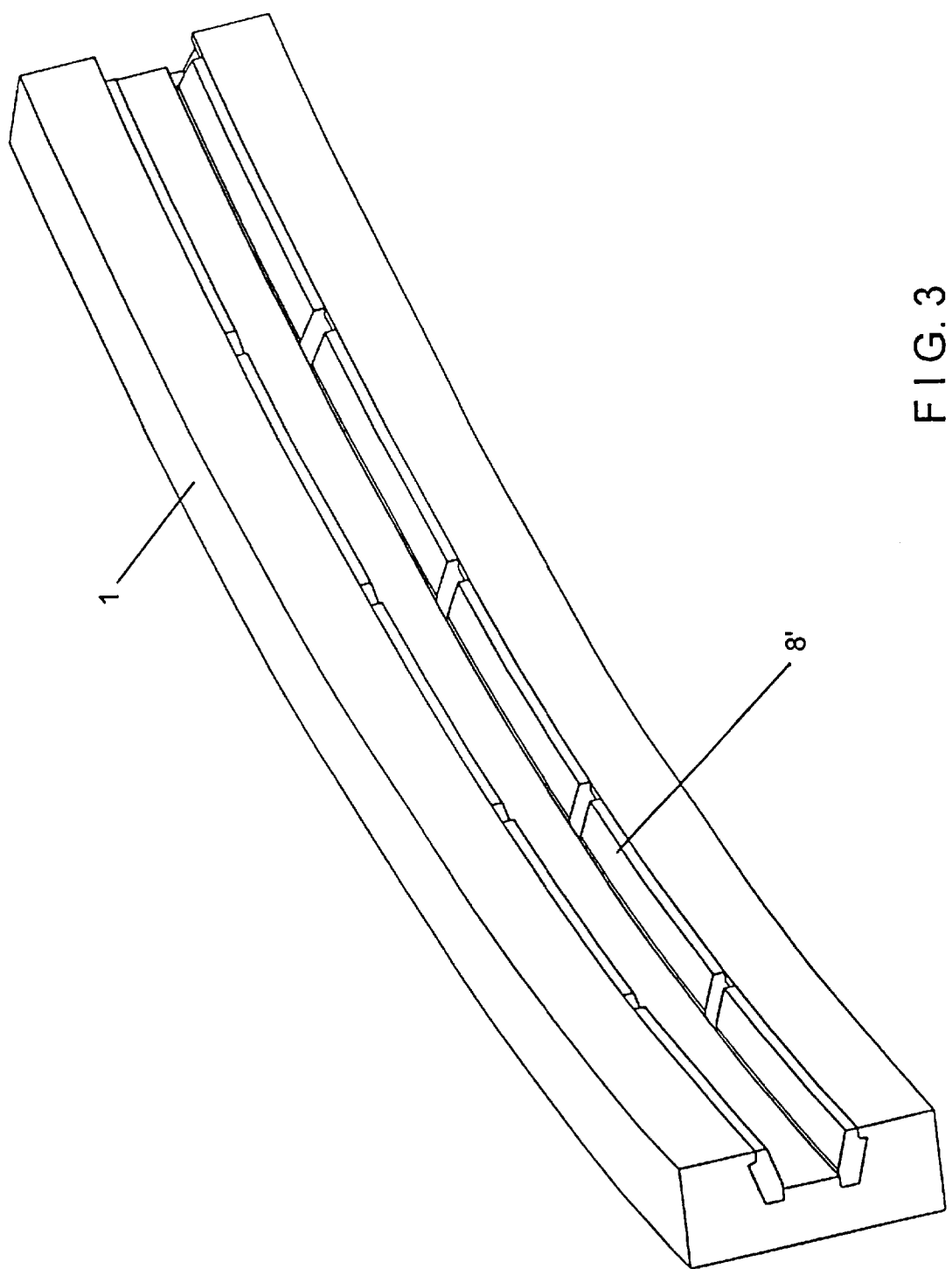
FIG. 3 shows, in perspective, a piece of the metal band of the system of the invention, including several jaws.
Figure 4A:
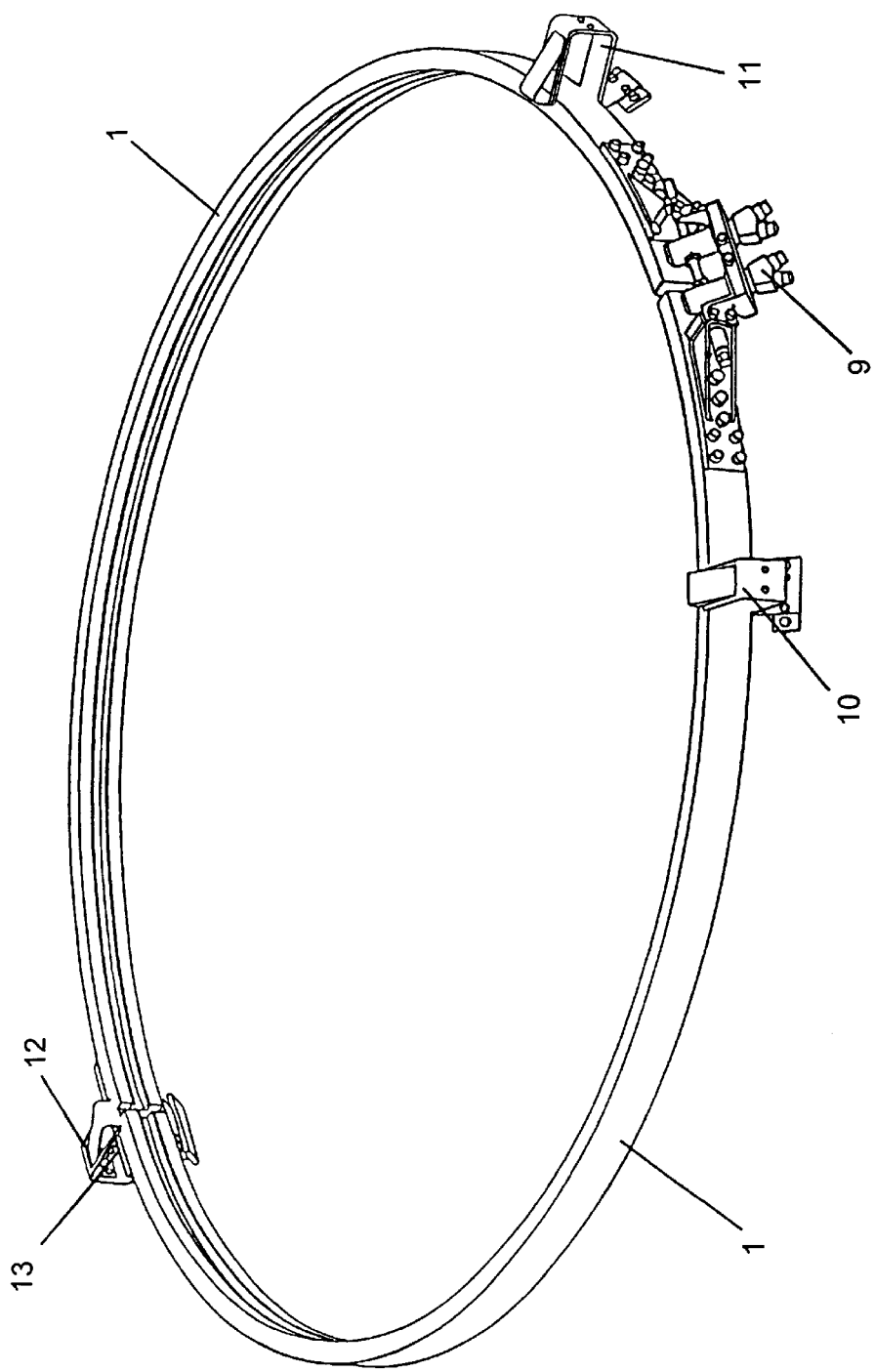
FIGS. 4a and 4b are perspective views which illustrate the metal band of the system of the invention, closed and open respectively, together with the supports intended to retain it on the launcher.
Figure 4B:
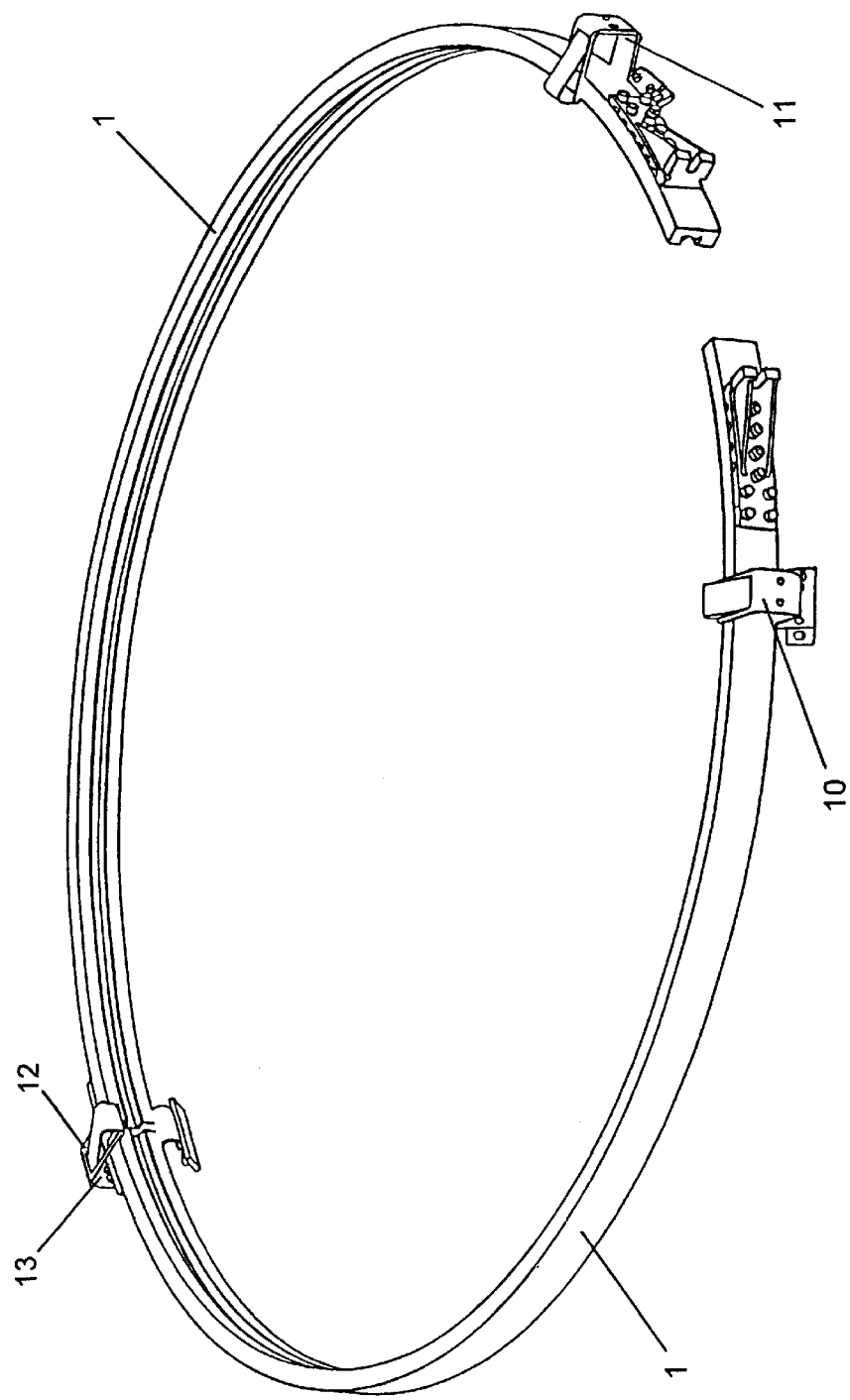

The tension on the band 1, converted into clamping pressure, is transmitted to the hoops 6 and 7 by means of wedge-shaped jaws of clamping elements 8 which are engaged in an inner channel of the metal band 1 in a discontinuous way, that is to say separated from one another, as has been highlighted in FIG. 3, in which the said separated clamping elements have been designated as 8', this discontinuity making it possible for the said clamping elements to slide circumferentially within the band 1, which leads to a uniform distribution of the tension.

As is depicted in the drawings, the ring 1 has an approximately C- or U-shaped cross-section. Nevertheless, other cross-sections would be possible for the said ring.

Equally, the cross-section of the clamping elements 8 can vary so as to conform to the application in each particular case, possibly being, for example, the result of combining the angles of the interface with the satellite 2 and the launcher 3. On the other hand, the clamping elements 8 may consist of a continuous profile of approximately U-shaped cross-section, as is illustrated in FIGS. 2, 3, 5 and 6, or the said jaws can be formed by two independent profiles 14 joined together through the base of the channel of the ring 1, as is illustrated in FIG. 7.

The structure of the launcher 3 is provided with three supports 10, 11 and 12 which are intended to retain the ring 1 when it opens at the moment when the satellite 2 is separated from the launcher 3. The support 12 carries a spring 13 which pulls on the ring 1 and thus contributes to separating it from the structures (satellite 2 and launcher 3) which have been kept together by means of the said ring until the moment when it opens.

The system of the invention can be applied to satellites of different diameters and can also be subjected to the differing tensions necessary to keep the satellite and its launcher joined together. As an example of a practical embodiment of the system of the invention, a prototype can be cited, constructed for a satellite 2 of 1.3 m diameter and for a tension force in the band 1 of 2.5 MT, (metric tons) in which the ring 1 has a width a of 38 mm and a thickness b of 20 mm, the thickness c of the wings of the U-shaped profile of the clamping elements 8 is 4 mm and the angle $\gamma$ formed by the inclined faces of the said wings is 30°.

Obviously, the values which have just been given have to be considered as merely illustrative and not limiting, given that, in the final analysis, such values have to be selected by taking the particular conditions of the application into account.

Equally, the angles $\alpha$ and $\beta$ illustrated in FIG. 5 may, by way of example, take values of 15° and 6°, respectively.

The operation of the system of the invention proceeds in the following way:

When a command activates the pyrotechnic charge unit 9 fixed to the tensioning bolt 4, the bolt is cut and hence the ring 1 moves so as to regain its original shape, opening and finally being retained, that is to say parked, in the three supports 10, 11 and 12 fixed to the structure of the launcher 3, of which the two supports 10, 11 close to the free ends of the ring 1 prevent the ring from continuing to open, while the opposite support 12 pulls the ring outwards by means of the spring 13, separating the ring from the structures 2, 3 retained by it and freeing them from its grip.

The advantage which the system of the invention confers is that of making it possible to withstand higher loadings (and hence to support heavier satellites) than the conventional band systems, by virtue of the extra rigidity provided by the circumferential continuity of the ring 1. For their part, the jaws 8 operate as an interface element which, on one hand, allows better matching to the manufacturing tolerances of the rings 1 and, on the other hand, allows the structural requirements of the ring 1 to be decoupled from the requirements for the contact between the said ring and the satellite 2 and launcher 3 structures.

Likewise, the fact that the system of the invention employs a continuous metal ring 1 affords an additional advantage in that it allows the mechanical tensioning of the band of the said ring to be replaced by thermal tensioning (banding), it being possible also to combine both forms of tensioning. The thermal tensioning further contributes to the uniformity of the tension applied by the metal band 1.

The above description seeks to bring together what are considered to be the essential characteristics of the present invention. Nevertheless, it is understood that the invention could be modified in various ways without thereby departing from its specific scope, which should be limited only by the content of the claims which follow.

What is claimed is:

1. A system for releasably attaching a satellite to a launcher comprising:

an open metal band having free ends, said band having an inner surface with a channel formed therein, a plurality of separate clamping elements slidably supported in said channel in said band, said clamping elements being made of a material different from said metal band, a bolt connecting said free ends of said metal band to tighten said band and apply tension thereto, said clamping elements each including upper and lower jaws which widen in a direction inwardly of said band and form an open wedge shape, the satellite and launcher including respective structures which are in contact along a joint interface and are engaged between said jaws of said clamping elements so that as tension is applied to said band by said bolt, said jaws engaging said structures of said satellite and launcher apply clamping pressure thereon to secure said structures in said band, a pyrotechnic device to cut said bolt and release the tension in said band and the clamping pressures of the clamping elements on the satellite and launcher structure when the satellite is to be separated from the launcher, and means for retaining the band and the clamping elements on the launcher structure when the satellite separates from the launcher.

2. A system as claimed in claim 1, wherein said means for retaining the band on the launcher structure comprises two supports fixed to the launcher structure and engaging said bands in proximity to said free ends thereof to retain said free ends when the bolt is cut, and a third support fixed to the launcher structure opposite said free ends of the band and including a spring engaging said band to apply a pulling force thereon to expand the band and release the satellite structure when the bolt is cut.

3. A system as claimed in claim 1, comprising end pieces on said free ends of the band, said bolt engaging said end pieces to tighten the band.

4. A system as claimed in claim 1, wherein a plurality of said bands are provided having channels with different cross-sectional sizes to receive different sizes of launching and satellite structures.

5. A system as claimed in claim 1, wherein a number of bands are provided having respective clamping elements of different cross-sectional sizes adapted to receive different sizes of launcher and satellite structures.

6. A system as claimed in claim 1, wherein said upper and lower jaws have respective clamping surfaces engaged with respective corresponding surfaces of said satellite and launcher structures, said clamping surfaces being inclined at an angle relative to a plane passing through said joint interface of said satellite and launcher structures.

7. A system as claimed in claim 1, wherein the clamping elements are made of a plastic or composite material.

8. A system as claimed in claim 7, wherein the metal ring is made of aluminum or an aluminum alloy.

9. A system as claimed in claim 1, wherein each of said clamping elements is fitted in said channel in the band for slidable movement circumferentially in said channel and is retained in said band in a direction radially thereof.

10. A system as claimed in claim 9, wherein said jaws define an open wedging angle therebetween.

11. A system as claimed in claim 9, wherein said upper and lower jaws of each clamping element are separate members diverging radially inwards of the band.

12. A system as claimed in claim 11, wherein each said clamping element has a cross-section of U or C shape corresponding to that of said channel.

* * * * *